United States Patent [19]

Thomas et al.

[11] Patent Number: 4,830,800
[45] Date of Patent: May 16, 1989

[54] METHOD OF PRODUCING A DENSE REFRACTORY SILICON NITRIDE ($SI_3N_4$) COMPACT WITH ONE OR MORE CRYSTALLINE INTERGRANULAR PHASES

[75] Inventors: Gareth Thomas, Berkeley; Sylvia M. Johnson, Piedmont, both of Calif.; Timothy R. Dinger, Chappaqua, N.Y.

[73] Assignees: The Regents of the University of California, Berkeley; SRI International, Menlo Park, both of Calif.

[21] Appl. No.: 78,515

[22] Filed: Jul. 27, 1987

[51] Int. Cl.[4] ............................................. C04B 35/58
[52] U.S. Cl. ....................................... 264/65; 264/66; 501/97
[58] Field of Search ...................... 264/66, 65; 501/97

[56] References Cited

U.S. PATENT DOCUMENTS

| | | | |
|---|---|---|---|
| 3,991,148 | 11/1976 | Lumby et al. | 501/98 |
| 4,179,301 | 12/1979 | Buljan | 501/97 |
| 4,264,548 | 4/1981 | Ezis | 264/65 |
| 4,280,850 | 7/1981 | Smith | 264/65 |
| 4,384,909 | 5/1983 | Layden | 501/97 |
| 4,401,617 | 8/1983 | Ezis et al. | 264/332 |
| 4,443,394 | 4/1984 | Ezis et al. | 501/97 |
| 4,552,851 | 11/1985 | Hsieh | 501/97 |
| 4,609,633 | 9/1986 | Fukuhara | 501/97 |

Primary Examiner—James Derrington
Attorney, Agent, or Firm—John P. Taylor

[57] ABSTRACT

An improved process for forming a dense silicon nitride compact having improved high temperature properties comprises: forming a glass using compounds, containing Al, Si, O, N, and a rare-earth element, known to form one or more crystalline phases; mixing this preformed glass in particulate form with silicon nitride powder; and densifying the mixture at an elevated temperature; and then forming one or more crystalline intergranular phases from the glass to thereby improve the high temperature characteristics of the resultant dense silicon nitride compact. In a preferred embodiment, the process includes heating the dense compact to a first temperature to form nucleates; and then heating the dense compact at a second temperature to grow the desired one or more crystalline intergranular phases on the nucleates. In another embodiment, the crystallization may be carried out by controlled direct cooling of the compact from the sintering temperature. The use of particles of a preformed glass, made from compounds known to form one or more crystalline phases, as the densification material provides a homogeneous mixture to ensure subsequent formation of the desired crystalline intergranular phases.

40 Claims, 2 Drawing Sheets

METHOD OF PRODUCING A DENSE REFRACTORY SILICON NITRIDE ($Si_3N_4$) COMPACT WITH ONE OR MORE CRYSTALLINE INTERGRANULAR PHASES

BACKGROUND OF THE INVENTION

1. Field of the Invention

This invention relates to a method for producing a dense silicon nitride ($Si_3N_4$) compact with one or more crystallized intergranular phases. More particularly, this invention relates to a process for producing a dense silicon nitride compact using as a sintering aid preformed glass in particulate form and composition capable of crystallization upon subsequent heating after densification of the silicon nitride.

2. Description of the Related Art

The use of nitrogen ceramics as high temperature structural components has increased dramatically in the past few years. The bulk of this increased usage and the correspondingly increased research has revolved around the use of silicon nitride ($Si_3N_4$) in advanced heat engine components. The use of silicon nitride for these applications stems from its excellent high temperature properties including very good thermal shock resistance due to a low linear coefficient of thermal expansion, as well as high strength and refractory properties.

The outstanding properties of silicon nitride ($Si_3N_4$) single crystals at high temperatures reflect a strong degree of covalent bonding which results in rather formidable problems in conventional ceramic powder processing techniques. Bulk and boundary diffusion coefficients for silicon nitride are orders of magnitude lower than for refractory oxides in the same temperature regime.

Thus, neck growth proceeds by the non-densifying processes of surface diffusion and evaporation/condensation resulting in a low strength ceramic due to the large pore fraction retained.

Processing techniques involving hot-pressing or hot isostatic pressing with the addition of oxide densification aids have resulted in the attainment of nearly theoretically dense pieces of silicon nitride. Such sintering aids promote densification through the formation of a low melting point eutectic resulting from the reaction of the densification aid and the surface silica layer present on the silicon nitride powder. However, the resulting ceramic has an undesirable microstructure which contains a glassy phase at grain boundaries and multi-grain junctions. This glassy phase is thought to be responsible for the loss of strength at high temperatures due to a grain boundary sliding mechanism which becomes active when the softening point of the glass is reached.

An obvious alternative, short of eliminating the undesirable intergranular phase entirely, is to increase its softening point, i.e., its refractoriness, into a temperature regime above the temperature range at which the ceramic will see service. This can be accomplished through the use of rareearth oxides as the densification additive. Of the rare-earth oxides, $Y_2O_3$ has the highest melting point (2410° C.) which suggests that formation of an intergrannular phase containing it will have correspondingly high softening, glass transition, and melting temperatures. $Al_2O_3$ additions to sintering additive compositions containing rare-earth oxides have been found to promote densification while suppressing the catastrophic oxidation experienced by $Y_2O_3$-fluxed silicon nitride at intermediate temperatures of 600°–1000° C.

For these reasons $Y_2O_3/Al_2O_3$-fluxed silicon nitride ($Si_3N_4$) has met with increasing technological success. Thus, Fukuhara et al U.S. Pat. No. 4,609,633 discloses a silicon nitride sintered compact formed using sintering aids or auxiliaries which comprise at least one oxide, nitride, or oxynitride of rare earth elements consisting of Sc, Y, and lanthanide elements; and at least one oxide, nitride, or oxynitride of Group IIA elements, and/or Group IIA elements, e.g., $Al_2O_3$. Powders of these materials are mixed with powders of silicon nitride prior to sintering to form the desired silicon nitride compact.

Hsieh U.S. Pat. No. 4,552,851 describes a process for forming a yttrium aluminate sintering aid for silicon nitride bodies which comprises prereacting oxides of yttrium and aluminum to form yttrium aluminate by heating a mixture of the oxides to 1000° to 1450° C. for a period of 3 to 20 hours. The pre-formed yttrium aluminate is then mixed with silicon nitride and the mixture is consolidated preferbly by hot pressing or hot isostatic pressing to form a dense silicon nitride compact.

Compositions containing such rare-earth oxides and aluminum oxide have even been used as bonding materials to bond or braze together previously formed silicon nitride parts. For example, Layden U.S. Pat. No. 4,384,909 discloses bonding or brazing compositions for bonding together previously formed ceramic parts of silicon nitride which brazing compositions may comprise $Si_3N_4$, $Al_2O_3$, and $Y_2O_3$ and either AlN or $SiO_2$. The composition which included $SiO_2$ was said to be a highly viscous fluid which cooled to a glass while the composition containing AlN was said to be expected to crystallize upon cooling. In using the compositions for bonding parts made from silicon nitride, the materials were blended with methanol to a smooth creamy consistency and the methanol slurry was placed between the parts to be joined. The assemblies were then fired at 1600° C. and then cooled.

It has also been recognized that conversion of the glassy intergranular phase of a sintered silicon nitride compact into a crystalline phase will improve the high temperature mechanical properties of such silicon nitride structures.

Ezis U.S. Pat. No. 4,264,548 discloses a method of making a silicon nitride object by forming a mixture of powders of silicon nitride ($Si_3N_4$) containing $SiO_2$ as an oxide coating, $Y_2O_3$, and $Al_2O_3$. After hot pressing at 1680°–1750° C., the object is relieved of pressure and temperature and allowed to cool. It is then heat treated at 1000°–1400° C. for a time period sufficient to provide a nucleating reaction in secondary phases formed as a result of the hot pressing. The resulting object is said to contain one or more of three crystallized forms consisting of $5Y_2O_3.4SiO_2Si_3N_4$; $2Y_2O_3.SiO_2Si_3N_4$; and $Y_2O_3.SiO_2$.

Smith et al U.S. Pat. No. 4,280,850 also describes a polycrystalline silicon nitride having a substantially crystalline intergranular phase formed by ball milling a densification aid such as $Y_2O_3$ with silicon nitride powder. The powder mixture may then be hot pressed at 1675°–1800° C. at 3000–5000 psi to form the dense compact. Crystallinity of the intergranular phase by exclusion of amorphous or glassy material is said to be achieved by either controlling the composition during processing to insure exclusion of glass stabilizing additives or impurities or by giving the compact a post-sintering crystallization heat treatment, e.g., heat treated for 5 hours at 1525° C.

Buljan U.S. Pat. No. 4,179,301 describes the production of a silicon nitride having a crystalline intergranular phase formed by adding to a powder mixture of silicon nitride and a densifying agent (such as an oxide of yttrium or magnesium) a nucleating agent of elemental Ti or Fe or as an oxide or nitride of these elements. The powder mixture is formed into a compact which is sintered at 1700° C. The compact is then cooled at 500° C. per hour. The patentee shows that the addition of the nucleating agent results in improved high temperature strength.

While it is, therefore, recognized that a densified silicon nitride compact containing crystalline intergranular phases will have superior high temperature properties, formation of such crystalline forms has always been carried out by heating of powdered mixtures of various densification agents and silicon nitride powder to sinter the silicon nitride by forming glassy intergrannular phases between the silicon nitride particles followed, in such cases, by subsequent formation of the crystalline phases either during controlled cooling of the sintered object or during subsequent heating steps. If the various powders comprising the densification materials and silicon nitride are not thoroughly mixed together, a nonuniform, i.e., nonhomogeneous glass may be formed comprising areas of different phases or areas which remain amorphous during subsequent attempts at crystallization. Furthermore, if the ratios of the densification materials used do not form crystalline phases, the desired subsequent formation of crystalline intergrannular phases can not be achieved.

SUMMARY OF THE INVENTION

We have discovered a method for forming a dense silicon nitride compact using particulate densification materials wherein subsequent crystallization of the intergranular phases of a dense silicon nitride compact, to provide enhanced high temperature properties, can be more easily achieved due to use of a predetermined ratio of materials known to subsequently form one or more crystalline phases and in a form which provides a homogeneous mixture of such materials. This does not leave it to chance as to whether one or more crystalline intergranular phases may be subsequently formed in the densified silicon nitride compact.

It is, therefore an object of this invention to provide a method for forming a dense silicon nitride compact having one or more crystalline intergranular phases by first forming a glass using ratios of materials known to form one or more crystalline phases and then mixing this preformed glass in particulate form with silicon nitride powder and densifying the mixture at an elevated temperature followed by heating the densified compact to form one or more crystalline intergranular phases to thereby improve the high temperature characteristics of the resultant dense silicon nitride compact.

It is another object of this invention to provide a method for forming a dense silicon nitride compact having crystalline intergranular phases by first forming a glass using ratios of compounds, containing Al, Si, O, N, and a rare-earth element, known to form one or more crystalline phases; then mixing this preformed glass in particulate form with silicon nitride powder; and densifying the mixture at an elevated temperature followed by further heating of the dense compact at a second temperature to grow the desired crystalline intergranular phases to thereby improve the high temperature characteristics of the resultant dense silicon nitride compact.

It is yet another object of this invention to provide a method for forming densified silicon nitride objects having crystalline intergranular phases by first forming a glass using ratios of $Al_2O_3$, $Si_3N_4$, a rare earth oxide, and optionally $SiO_2$ known to form one or more crystalline phases; then mixing this preformed glass in particulate form with silicon nitride powder; densifying the mixture at an elevated temperature; heating the dense compact to a first nucleation temperature to form nucleates; and then further heating the dense compact at a second temperature to grow the desired one or more crystalline intergranular phases on the nucleates and convert substantially all of the glassy intergranular phase to one or more crystalline phases; to thereby improve the high temperature characteristics of the resultant dense silicon nitride compact.

It is a further object of this invention to provide a method for forming densified silicon nitride objects having crystalline intergranular phases by first forming a glass using ratios of $Al_2O_3$, $Si_3N_4$, a rare earth oxide, and optionally $SiO_2$ known to form one or more crystalline phases; then mixing this preformed glass in particulate form with silicon nitride powder; densifying the mixture at an elevated temperature; heating the dense compact to a first nucleation temperature to form nucleates; and then slowly cooling the dense compact to grow the desired one or more crystalline intergranular phases on the nucleates and convert substantially all of the glassy intergranular phase to one or more crystalline phases; to thereby improve the high temperature characteristics of the resultant dense silicon nitride compact.

These and other objects of the invention will be apparent from the following description and accompanying drawings.

In accordance with the invention, an improved process for forming a dense silicon nitride compact having improved high temperature properties comprises forming a glass using compounds, containing Al, Si, O, N, and a rare-earth element, known to form one or more crystalline phases; mixing this preformed glass in particulate form with silicon nitride powder; and densifying the mixture at an elevated temperature followed by further heating of the dense compact at a second temperature to grow crystalline intergranular phases to thereby improve the high temperature characteristics of the resultant dense silicon nitride compact.

In a preferred embodiment, the process further includes the steps of heating the dense compact to a first nucleation temperature to form nucleates; and then further heating the dense compact at a second temperature to grow the desired crystalline intergranular phases on the nucleates.

In another embodiment, the process may comprise slowly cooling the compact from the densification temperature to form the desired crystalline intergranular phases.

DETAILED DESCRIPTION OF THE INVENTION

The invention provides a process for forming a dense silicon nitride ($Si_3N_4$) compact having improved high temperature properties by converting substantially all of the glassy intergranular phase formed from the densification agent or sintering aid during densification into one or more crystalline inergranular phases between the silicon nitride particles in the dense compact. The process is further characterized by the use of a densification agent in particulate form which is a preformed glass formed from components and in a stoichiometric ratio known to form one or more crystalline phases so that the subsequent crystallization of the glassy intergranular phase formed during densification is not left to chance.

The elements used in forming the glass used as the densification agent consist of Al, Si, O, and N, together with a rare-earth. A preferable rare-earth element used in the glass is yttrium although the use of other rare-earth compounds as a part of the glass densification agent, such as any of the elements in the lanthanum series, are within the scope of the invention.

The Al, Si, and rare-earth elements are usually used as compounds which are either oxides or nitrides. Preferably, the aluminum is in the form of $Al_2O_3$ while the silicon is preferably used as $Si_3N_4$ since this combination has been found to be superior in providing the desired amount of nitrogen in the glass composition. AlN, however, can be used if desired while the use of some $SiO_2$, in addition to the $Si_3N_4$, is within the scope of the invention to vary the ratio of silicon to nitrogen in the glass. The rare-earth will usually be used in the form of an oxide.

The ratio of the elements used in the glass may be varied. However, in accordance with the invention, the ratio must be such that the resultant glass will be capable of subsequent crystallization into one or more crystalline phases. It should be noted that the stoichiometric amounts of the elements need not be such that only a single crystalline phase is formed. The purpose of forming one or more crystalline intergranular phases from the glass phase which forms between the silicon nitride particles during the densification step is to provide enhanced high temperature properties to the dense silicon nitride by eliminating softening (and possibly melting) of such glass. Replacement of the glass by crystalline material, of either single phase or of multiple phases, will accomplish this goal.

In general, the amount of each of the elements used, in atomic wt. %, will vary from about 4–25 wt. % yttrium, 10–25 wt. % silicon, 0.5–12 wt. % aluminum, 48–64 wt. % oxygen, and 0.5–12 wt. % nitrogen.

Figure 1:
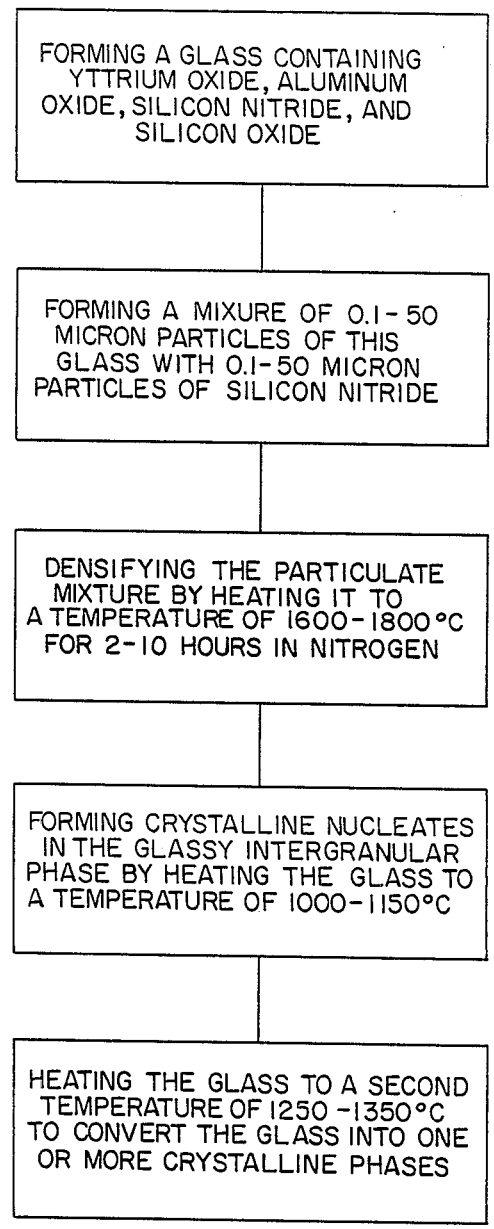
FIG. 1 is a flowsheet illustrating the process of the invention.
Figure 2:
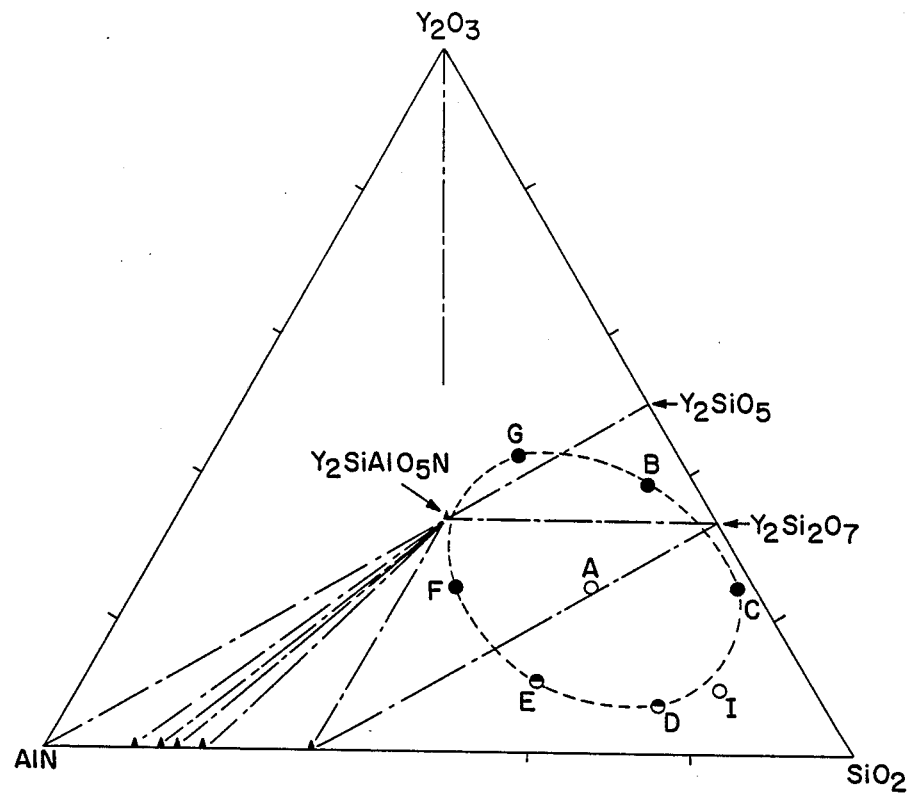
FIG. 2 is a ternary diagram of yttrium oxide, aluminum nitride, and silicon oxide showing a glass forming area representing ratios of the elements in these compounds where crystallinity is known to occur.

Referring to FIG. 2, the ternary phase diagram therein shows a shaded area within which a number of combinations of ratios of the Al, Si, Y, O, and N elements used in the densification agent or sintering aid have been found to form crystalline material from a starting glass. However, we do not wish to be limited to the use of, in the densification agent, only combinations falling within the shaded area, as any combination of the above five elements which will form a homogeneous glass and subsequently crystallize should be deemed to be within the scope of the invention. Generally, the amounts of the five elements in the densification agent, in accordance with the invention, should satisfy the following formula:

$$2O + 3N = 4Si + 3Al + 3Y$$

It must be recognized, however, that in any formulas expressing the ratios of the five ingredients, it must be taken into account that there may be some dissolution of the $Si_3N_4$ and, therefore, it may be empirically determined that the densification agent should be slightly deficient in these two elements to compensate for this.

It must also be pointed out that the resulting densification composition must also possess the basic characteristics of a densification agent as well, i.e., the capability of forming a liquid phase to promote sintering at a temperature of 1750° C. or less.

It should be further noted, with respect to FIG. 2, that the FIG. is intended to only show, within the circled area, the atomic ratios of the five elements which should be present for homogeneous glass formation and crystallization to occur. The combination of elements need not have been formed only from the three compounds shown at the three corners of the phase diagram, (e.g., $Si_3N_4$ may be the source of nitrogen rather than AlN).

The compounds containing these elements are thoroughly mixed together in particulate form prior to heating to form the desired glass. While the particle sizes of the compounds are not important at this stage, the particles must be small enough to permit complete mixing; as an important feature of this invention is the provision and use of a homogeneous glass as the densification agent to ensure substantially complete subsequent crystallization of the glass. Preferably, therefore, the compounds are provided at a particle size range of from about 0.1 to 50 microns, e.g., about 10 microns, and then thoroughly mixed together to form a homogeneous powder mixture. Conveniently, both the formation of the desired particle size and the mixing may be accomplished by ball milling the compounds together.

The homogeneous powder mixture is then heated to form the desired glass which will then also be of homogeneous makeup. The homogeneous nature of this preformed glass, which is to be used as the densification agent, comprises a portion of what characterizes the invention from previous attempts to form crystalline intergranular phases in dense silicon nitride bodies. Such prior attempts were made using glass formed in situ during the densification process from powders comprising the components of the desired glass.

The temperature to which the homogeneous powder mixture should be heated will, of course, vary somewhat with the makeup of the mixture of oxide and nitride compounds therein. However the temperature should be high enough to permit the formation of a glass, i.e., to a temperature high enough that all of the compounds melt into, or form, a liquid.

The time period during which the homogeneous powder mixture should be heated should be sufficient to allow for diffusion and homogenization of the resulting glass. The glass formation should be carried out under an inert atmosphere, such as an argon or nitrogen atmosphere, but preferably nitrogen, and preferably at a high pressure, i.e., about 15 to 20 atmospheres.

The resulting glass is allowed to cool and then is crushed and formed into fine powder by ball milling, or any other convenient form of achieving the desired particle size which will not substantially contaminate the glass, to form glass particles which are then screened to provide a particle size range of from about 0.1 to 50 microns, preferably about 1–15 microns, and more preferably less than about 10 microns. Since the $Si_3N_4$ particles need to be about 1 micron to sinter effectively, the most preferred particle size for the glass densification agent particles, is to match the $Si_3N_4$ particle size, i.e., about 1 micron.

The powdered glass densification agent is then thoroughly mixed, i.e., by ball milling or the like, with the silicon nitride particles which are to be densified into a shaped compact. As stated above, the particle size of the silicon nitride should be approximately the same or somewhat smaller than that of the glass particles to promote complete mixing of the silicon nitride and glass particles. Thus, the particle size of the silicon nitride powder should also range from about 0.1 to 50 microns, preferably about 0.1–15 microns, with the smaller particles of silicon nitride, i.e., about 1 micron or less, being most preferred for low pressure or pressureless sintering.

The ratio of silicon nitride to glass densification agent in the particle mixture preferably may range from about 3 to 20 wt. % glass, and more preferably about 5 to 15 wt. % glass with the balance consisting essentially of the silicon nitride particles. While normally at least about 5 wt. % of glass will be used in the glass/silicon nitride powder mixture, the use of less glass, i.e., about 3–4 wt. % or less, may be possible when forming the compact under high pressure conditions, e.g., hot isostatic pressing at 10,000–25,000 psi.

The particulate mixture may now be formed into the desired shape such as by pressing, molding or the like to form a green body or compact. This may be accomplished in any conventional manner using conventional binders such as carbowax, etc., which will volatilize off during the subsequent densification step and therefore not interfere with the formation of the glassy intergranular phase or the eventual crystallization of the glass. In a preferred treatment, the particulate mixture is heated to about 400° C. for 2 hours in a $H_2$ atmosphere.

The shaped particulate mixture is now densified by heating to a temperature of from about 1600°–1800° C., preferably about 1700°–1750° C., for a period of from about 2 to 10 hours, preferably about 4 to 8 hours. Longer periods of time may be used, but are unnecessary and, therefore, economically unjustified. Temperatures of at least 1600° C. are needed to melt the glass densification agent, while temperatures above 1800° C. result in unacceptable losses of $Si_3N_4$ and other components in the glass, e.g., SiO, by vaporization.

It should be further noted, in this regard, that the use of a preformed glass as the densification agent not only facilitates the subsequent crystallization of the glass but also permits the use of shorter sintering times because the glass is already homogeneous and slightly lower densification temperatures because the already formed glass particles will melt at a lower temperature. This, in turn, both conserves energy and reduces vaporization losses as well.

During the densification step, the particulate mixture should be bathed in an inert atmosphere such as an atmosphere of nitrogen, preferably at a pressure of 50–150 psi, e.g., about 100 psi to avoid undesirable oxidation. However, the $N_2$ should not be flowing. In addition, to avoid losses by vaporization, it is preferred, during the densification step, to pack the shaped green compact in a powder mixture of $Si_3N_4$ and $SiO_2$, which may be in a ratio of about 70–90 wt. % $Si_3N_4$, preferably about 80 wt. % $Si_3N_4$, with the balance consisting essentially of $SiO_2$. This will provide a partial pressure of $Si_3N_4$ and SiO which will inhibit vaporization of the $Si_3N_4$/additive powder in the green compact during the densification.

The densification step may be carried out without the application of further pressure to the compact other than the inert gas atmosphere. Alternatively, the densification may be carried out at high pressure such as while uniaxially hot pressing the compact at a pressure of 5,000 psi or more, or by hot isostatic pressing at pressures of 10,000–25,000 psi.

After formation of the dense silicon nitride compact, the resultant glassy intergranular phase, comprising the glass densification agent which has solidified between the silicon nitride particles, in accordance with the invention, is substantially converted to one or more crystalline phases to achieve the desired high temperature properties of the compact. By substantially is meant that at least 90 wt. % of the glass, preferably 99 wt. % or more of the glass, is converted to one or more crystalline phases.

Conversion of the glassy intergranular phase of the compact to one or more crystalline phases after the densification step may be carried out after the compact has cooled back to room temperature. Advantageously, however, to conserve energy, the compact may be allowed to cool to about 1000°–1150° C. and then maintained at this temperature, while still under an inert atmosphere such as nitrogen, for from about 45 minutes to 75 minutes, preferably about 60 minutes, to permit self seeding of the glass by formation of crystalline nucleates or seed in the glass.

The temperature of the compact may then be raised to from about 1250°–1350° C., preferably about 1300° C., to permit crystal growth on the nucleates. The compact is maintained at this temperature until substantially all of the glass has been converted to one or more crystalline phases. This will normally be accomplished in a period of from about 30 up to as long as 15 hours or longer, e.g., about 60 minutes or more, although the exact time period may vary somewhat depending upon the exact composition of the glass. The exact time and temperature needed to secure substantially complete crystallization of any particular glass composition may be empirically determined for that composition by examining the resultant compact for crystallinity using, for example, electron microscopy techniques (TEM).

When the crystallization step is carried out immediately following the densification step, it is preferable to evacuate from the reaction chamber any air which may have been produced during the densification step.

It should be noted here that with very slow and controlled cooling, it is possible, and therefore within the scope of this invention, to crystallize the glass during such a controlled cooling without reheating the compact it to form nucleates or the use of a second reheating step. Such a procedure may lend itself more readily to a continuous process.

The following example will serve to further illustrate the process of the invention.

A number of mixtures of $Y_2O_3$, $Al_2O_3$, $Si_3N_4$, and $SiO_2$ were each ball milled in a planetary ball mill for 8 hours. Each mixture was then put into a molybdenum crucible and put into a furnace from which all air ($O_2$) was evacuated by pumping and flushing with nitrogen. The furnace was heated to a temperature of 1650° C. while maintaining sufficient nitrogen pressure to achieve a pressure of about 300 psi by the time the 1650°

C. temperature was reached. The furnace was held at this temperature for 1 hour and then the resultant glass in the crucible was allowed to cool as fast as the furnace cooled. The result in each case, except for sample I, was a glass which, respectively, ranged in color from white to dark gray. The resultant glass was then removed from the crucible and particulated in preparation for use as the densification agent in forming a densified silicon nitride body.

In each case, the glass was then crushed, screened, and then ball milled to an average particle size of approximately 1 microns or less. The resultant glass particles were then thoroughly mixed with silicon nitride particles having an average particle size of about 1 micron in a ratio of 15 wt. % glass and 85 wt. % silicon nitride. The powder mixture was then shaped into a green compact by die pressing at 5000 psi. The green shaped body was then packed in a 80 wt. % $Si_3N_4$/20 wt. % $SiO_2$ powder mixture and placed into a furnace.

The furnace was then heated to 1750° C. while maintaining a nitrogen pressure in the furnace. The furnace was maintained at this temperature for 6 hours after which the temperature was lowered to 1100° C. and held at this temperature for 60 minutes to permit formation of crystalline seed or nucleates in the glassy intergranular phase between the silicon nitride particles. The temperature of the furnace was then raised to 1300° C. and the furnace was held at this temperature for an additional 60 minutes to permit crystal growth on the nucleates following which the furnace was allowed to cool to recover the compacts which appeared to be crystallized.

Table 1 below indicates the respective atomic percent of Y, Si, Al, O, and N of the glass densification agent in each sample while the letters for the samples in Table 1 correspond to the letters on the graph of FIG. 2.

TABLE 1

| Sample | Y | Si | Al | O | N |
|--------|-------|-------|-------|-------|-------|
| A | 14.81 | 16.86 | 6.30 | 55.72 | 6.30 |
| B | 20.47 | 15.01 | 1.69 | 61.14 | 1.69 |
| C | 13.94 | 21.22 | 0.80 | 63.22 | 0.82 |
| D | 4.62 | 24.78 | 7.03 | 56.51 | 7.06 |
| E | 7.57 | 19.11 | 11.83 | 49.65 | 11.83 |
| F | 15.57 | 12.44 | 11.84 | 48.31 | 11.84 |
| G | 22.93 | 10.37 | 5.69 | 55.31 | 5.69 |
| I | 6.22 | 23.41 | 6.22 | 61.02 | 3.12 |

Thus, the invention provides an improved process for the formation of dense silicon nitride compacts wherein the densification agent comprises a glass in particulate form which has been preformed using selected compounds in a stoichiometric ratio known to crystallize into one or more crystalline phases. Subsequent heating of the densified compact to a crystallization temperature results in the conversion of substantially all of the glassy intergranular phase into one or more crystalline phases which results in a silicon nitride compact exhibiting superior high temperature properties, i.e., higher strength at temperatures above 1400° C. While a particular embodiment of the invention has been described, minor modifications of the invention will become apparent to those skilled in the art and are deemed to be within the scope of the invention, which is intended to be limited only by the scope of the appended claims.

What is claimed is:

1. An improved process for forming a dense silicon nitride compact having improved high temperature properties comprising:

(a) forming a glass from a homogeneous mixture of compounds, containing Al, Si O, N, and a rare-earth element, known to form one or more crystalline phases, said mixture of compounds comprising:
        (i) silicon nitride;
        (ii) aluminum oxide or auuminum nitride; and
        (iii) a rare earth oxide or a rare earth nitride;
    (b) mixing this performed glass in particulate form with silicon nitride powder;
    (c) densifying the particulate mixture at an elevated temperature by forming a glassy intergranular phase between said silicon nitride particles; and
    (d) forming one or more crystalline intergranular phases between the silicon nitride particles in said dense silicon nitride compact;

whereby the high temperature characteristics of the resultant dense silicon nitride compact are enhanced.

2. An improved process for forming a dense silicon nitride compact having improved high temperature properties comprising:

(a) formimg a homogeneous mixture of compounds, consisting essentially of the elements Al, Si, O, N, and a rare-earth element, and known to form one or more crystalline phases, said mixture of compounds comprising:
        (i) silicon nitride or a mixture of silicon nitride and silicon dioxide;
        (ii) aluminum oxide or aluminum nitride; and
        (iii) a rare earth oxide or a rare earth nitride;
    (b) melting said mixture of compounds to form a glass;
    (c) particularizing said glass;
    (d) mixing said particularized glass with silicon nitride powder;
    (e) densifying the particulate mixture at an elevated temperature by forming a glassy intergranular phase between said silicon nitride particles; and
    (f) forming one or more crystalline intergranular phases between the silicon nitride particles in said dense silicon nitride compact;

whereby the high temperature characteristics of the resultant dense silicon nitride compact are enhanced.

3. The process of claim 2 wherein said step of forming said one or more crystalline intergranular phases between the silicon nitride particles in said dense silicon nitride compact further comprises heating said dense silicon nitride compact at a second temperature to form one or more crystalline intergranular phases between the silicon nitride particles in said dense silicon nitride compact.

4. The process of claim 3 wherein said step of further heating said dense silicon nitride compact at a second temperature to form said one or more crystalline intergranular phases between said silicon nitride particles in said dense silicon nitride compact further comprises forming substantially all of said glassy intergranular phase into one or more crystalline intergranular phases.

5. The process of claim 4 wherein said step of forming said one or more crystalline intergranular phases includes the further steps of heating said dense silicon nitride compact at a first nucleation temperature to form crystalline nucleates in the glassy intergranular phase; and then further heating said dense silicon nitride compact at a second temperature to grow said desired one or more crystalline intergranular phases on said nucleates.

6. The process of claim 5 wherein said step of heating said dense silicon nitride compact at a first nucleation temperature to form crystalline nucleates in the glassy intergranular phase further comprises maintaining said dense silicon nitride compact at a temperature of from about 1000° to 1150° C. for a period of from about 45 to 75 minutes to form said nucleates.

7. The process of claim 6 wherein said step of heating said dense silicon nitride compact at a second temperature to grow said desired one or more crystalline intergranular phases on said nucleates further includes maintaining said dense silicon nitride compact at a temperature of from about 1250° to 1350° C. for a period of from about 30 to about 16 hours to form said one or more crystalline intergranular phases on said nucleates.

8. The process of claim 2 wherein said step of forming said one or more crystalline intergranular phases between the silicon nitride particles in said dense silicon nitride compact further comprises slowly cooling said densified silicon nitride compact after said densification step.

9. The process of claim 5 wherein said step of forming said glass further comprises mixing and melting together compounds consisting essentially of a total atomic weight % of about 4-25 wt. % yttrium, 10-25 wt. % silicon, 0.5-12 wt. % aluminum, 48-64 wt. % oxygen, and 0.5-12 wt. % nitrogen.

10. The process of claim 4 wherein said step of forming said glass by using compounds, containing Al, Si, O, N, and a rare-earth element, known to form one or more crystalline phases further comprises the steps of mixing said compounds together in particulate form, having a particle size range of from 0.1 to 50 microns, to provide a homogeneous mixture of said compounds; heating said homogeneous particulate mixture to a temperature sufficiently high to melt said particulate mixture to form a glass; cooling said glass; and then forming particles from said glass having a particle size range of from 0.1 to 50 microns to permit formation of a homogeneous mixture of said glass particles and said particles of silicon nitride.

11. The process of claim 10 wherein said homogeneous mixture of said compounds is heated to a temperature of at least 1000° C. to form said glass.

12. The process of claim 4 wherein said step of mixing said preformed glass in particulate form with silicon nitride powder further comprises mixing said preformed glass particulate with silicon nitride powder having a particle size range of from 0.1-10 microns.

13. The process of claim 4 wherein said step of densifying said particulate mixture at an elevated temperature further comprises heating said particulate mixture to a temperature of from 1600° to 1800° C. for a period of from 2 to 10 hours.

14. The process of claim 13 wherein said densification is carried out in an atmosphere of $N_2$ at a pressure of from about 10-20 atmospheres.

15. The process of claim 13 wherein said densification is carried out under hot isostatic pressing conditions at pressures of 10,000-25,000 psi.

16. The process of claim 4 wherein said rare-earth element consists of yttrium and said step of forming a glass from a homogeneous mixture of compounds, containing Al, Si, O, N, and a rare-earth element, known to form one or more crystalline phases, further comprises selecting compounds having combined total atomic wt. % of said elements generally lying within the circled area shown in FIG. 2.

17. An improved process for forming a dense silicon nitride compact having improved high temperature properties comprising:
 (a) forming a homogeneous mixture of at least $Al_2O_3$, $Y_2O_3$, and $Si_3N_4$ in a stoichiometric ratio known to be capable of forming one or more crystalline phases;
 (b) heating said homogeneous mixture to a temperature sufficient to melt said mixture to form a glass;
 (c) forming particles from said glass having a particle size range of from 0.1 to 50 microns;
 (d) mixing said glass particles with silicon nitride particles having a particle size range of from 0.1-10 microns;
 (e) densifying the particulate mixture by heating said mixture to a temperature of from about 1600° to 1800° C. and maintaining said mixture at this temperature for a period of from about 2 to 10 hours in a nitrogen atmosphere to form a dense silicon nitride compact having a glassy intergranular phase;
 (f) further heating said dense silicon nitride compact at a temperature of from about 1000° to 1150° C. for a period of from about 45 to 75 minutes to form crystalline nucleates in said glassy intergranular phase; and
 (g) heating said dense silicon nitride compact to a second temperature of from about 1250° to 1350° C. for a period of from about 30 minutes to 16 hours to form substantially all of said glassy intergranular phase into one or more crystalline intergranular phases;
whereby the high temperature characteristics of the resultant dense silicon nitride compact are enhanced by the presence of said one or more crystalline intergranular phases between said silicon nitride particles.

18. The process of claim 17 wherein said step of forming said homogeneous mixture of at least $Al_2O_3$, $Y_2O_3$, and $Si_3N_4$ further includes the use of said compounds in an amount sufficient to provide a total atomic weight % of about 4-25 wt. % yttrium, 10-25 wt. % silicon, 0.5-12 wt. % aluminum, 48-64 wt. % oxygen, and 0.5-12 wt. % nitrogen.

19. The process of claim 18 wherein said step of forming said homogeneous mixture of at least $Al_2O_3$, $Y_2O_3$, and $Si_3N_4$ further includes $SiO_2$.

20. The process of claim 18 wherein said step of forming particles from said glass further includes forming particles having a particle size range of from about 1-15 microns.

21. The process of claim 18 wherein said step of densifying said mixture further comprises heating said mixture to a temperature of about 1700° to 1750° C. for a period of from about 4 to 8 hours.

22. The process of claim 18 wherein said step of heating said dense silicon nitride compact to form crystalline nucleates in said glassy intergranular phase further comprises maintaining said dense silicon nitride at a temperature of about 1100° C. for a period of at least about 60 minutes.

23. The process of claim 18 wherein said step of heating said dense silicon nitride to a second temperature to form substantially all of said glassy intergranular phase into one or more crystalline intergranular phases further comprises heating said dense silicon nitride to a temperature of about 1300° C. for at least about 60 minutes.

24. An improved process for forming a dense silicon nitride compact having improved high temperature properties comprising:

(a) forming a homogeneous mixture consisting essentially of $Al_2O_3$, $Y_2O_3$, $Si_3N_4$, and $SiO_2$ in a stoichiometric ratio selected to provide about 4–25 wt. % yttrium, 10–25 wt. % silicon, 0.5–12 wt. % aluminum, 48–64 wt. % oxygen, and 0.5–12 wt. % nitrogen and capable of forming one or more crystalline phases;

(b) heating said homogeneous mixture to a temperature sufficient to melt said mixture to form a glass;

(c) forming particles from said glass having a particle size range of from 1 to 5 microns;

(d) mixing said glass particles with silicon nitride particles having a particle size range of from 0.1–10 microns;

(e) densifying the particulate mixture by heating said mixture to a temperature of from about 1700° to 1750° C. and maintaining said mixture at this temperature for a period of from about 4 to 8 hours to form a dense silicon nitride compact having a glassy intergranular phase;

(f) further heating said dense silicon nitride compact at a temperature of about 1100° for a period of at least about 60 minutes to form crystalline nucleates in said glassy intergranular phase; and (g) heating said dense silicon nitride compact to a second temperature of about 1300° C. for a period of at least about 60 minutes to form substantially all of said glassy intergranular phase into one or more crystalline intergranular phases;

whereby the high temperature characteristics of the resultant dense silicon nitride compact are enhanced by the presence of said one or more crystalline intergranular phases between said silicon nitride particles.

25. An improved process for forming a dense silicon nitride compact having improved high temperature properties comprising:

(a) forming a homogeneous mixture comprising $Al_2O_3$, $Y_2O_3$, and $Si_3N_4$ in a stoichiometric ratio known to form one or more crystalline phases;

(b) melting said mixture to form a glass;

(c) particularizing said glass;

(d) mixing said particularized glass with silicon nitride powder;

(e) densifying the particulate mixture at an elevated temperature by forming a glassy intergranular phase between said silicon nitride particles; and (f) forming one or more crystalline intergranular phases between the silicon nitride particles in said dense silicon nitride compact;

whereby high temperature characteristics of the resultant dense silicon nitride compact are enhanced.

26. The process of claim 25 wherein said step of forming said homogeneous mixture comprising $Al_2O_3$, $Y_2O_3$, and $Si_3N_4$ further comprises mixing particulate $SiO_2$ with said other compounds.

27. The process of claim 25 wherein said step of forming said one or more crystalline intergranular phases between the silicon nitride particles in said dense silicon nitride compact further comprises heating said dense silicon nitride compact at a second temperature to form one or more crystalline intergranular phases between the silicon nitride particles in said sense silicon nitride compact.

28. The process of claim 27 wherein said step of further heating said dense silicon nitride compact at a second temperature to form one or more crystalline intergranular phases between said silicon nitride particles in said dense silicon nitride compact further comprises forming substantially all of said glassy intergranular phase into one or more crystalline intergranular phases.

29. The process of claim 27 wherein said step of forming said homogeneous mixture of $Al_2O_3$, $Y_2O_3$, and $Si_3N_4$ in a stoichiometric ratio known to form one or more crystalline phases further comprises mixing said compounds in a ratio consisting essentially of a total atomic weight % of about 4–25 wt. % yttrium, 10–25 wt. % silicon, 0.5–12 wt. % aluminum, 48–64 wt. % oxygen, and 0.5–12 wt. % nitrogen.

30. The process of claim 27 wherein said step of forming said homogeneous mixture of compounds further comprises mixing said compounds together in particulate form, having a particle size range of from 0.01 to 50 microns, to provide a homogeneous mixture of said compounds; and said step of particularizing said glass further comprises forming particles from said glass having a particule size range of from 0.1 to 50 microns to permit formation of a homogeneous mixture of said glass particles and said particles of silicon nitride.

31. The process of claim 27 wherein said homogeneous mixture of said compounds is heated to a temperature of at least 1000° C. to form said glass.

32. The process of claim 27 wherein said step of mixing said preformed glass in particulate form with silicon nitride powder further comprises mixing said preformed glass particulate with silicon nitride powder having a particle size range of from 0.1–10 microns.

33. The process of claim 27 wherein said step of densifying said particulate mixture at an elevated temperature further comprises heating said particulate mixture to a temperature of from 1600° to 1800° C. for a period of from 2 to 10 hours.

34. The process of claim 27 whrein said step of densifying said particulate mixture is carried out in an atmosphere of $N_2$ at a pressure of from about 10–20 atmospheres.

35. The process of claim 27 wherein said step of densifying said particulate mixture is carried out under hot isostatic pressing conditions at pressures of 10,000–25,000 psi.

36. The process of claim 27 wherein said step of forming said one or more crystalline intergranular phases includes the further steps of heating said dense silicon nitride compact at a first nucleation temperature to form crystalline nucleates in the glassy intergranular phase; and then further heating said dense silicon nitride compact at a second temperature to grow said desired one or more crystalline intergranular phases on said nucleates.

37. The process of claim 36 wherein said step of heating said dense silicon nitride compact at a first nucleation temperature to form crystalline nucleates in the glassy intergranular phase further comprises maintaining said dense silicon nitride compact at a temperature of from about 1000° to 1150° C. for a period of from about 45 to 75 minutes to form said nucleates.

38. The process of claim 36 wherein said step of heating said dense silicon nitride compact at a second temperature to grow said desired one or more crystalline intergranular phases on said nucleates further includes maintaining said dense silicon nitride compact at a temperature of from about 1250° to 1350° C. for a period of from about 30 to about 16 hours to form said one or more crystalline intergranular phases on said nucleates.

39. The process of claim 26 wherein said step of forming said one or more crystalline intergranular phases between the silicon nitride particles in said dense silicon nitride compact further comprises slowly cooling said densified silicon nitride compact after said densification step.

40. An improved process for forming a dense silicon nitride compact having improved high temperature properties comprising:
(a) forming a glass from a homogeneous mixture of compounds, which compounds consist essentially of the elements Al, Si, O, N, and a rare-earth compound and are capable of forming one or more crystalline phases, said mixture of compounds further comprising:
  (i) silicon nitride or a mixture of silicon nitride and silicon dioxide;
  (ii) aluminum oxide or aluminum nitride; and
  (iii) a rare earth oxide;
(b) mixing this preformed glass in particulate form with silicon nitride powder;
(c) densifying the particulate mixture at an elevated temperature by forming a glassy intergranular phase between said silicon nitride particles; and
(d) forming one or more crystalline intergranular phases between the silicon nitride particles in said dense silicon nitride compact;
whereby the high temperature characteristics of the resultant dense silicon nitride compact are enhanced.

* * * * *